(12) United States Patent
Furutake

(10) Patent No.: US 11,796,755 B2
(45) Date of Patent: Oct. 24, 2023

(54) LENS MODULE AND VEHICULAR IMAGING DEVICE

(71) Applicant: DENSO CORPORATION, Kariya (JP)

(72) Inventor: Yasuki Furutake, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/717,406

(22) Filed: Dec. 17, 2019

(65) Prior Publication Data

US 2020/0200990 A1 Jun. 25, 2020

(30) Foreign Application Priority Data

Dec. 19, 2018 (JP) ................................. 2018-237464

(51) Int. Cl.
*G02B 7/02* (2021.01)

(52) U.S. Cl.
CPC .................................. *G02B 7/021* (2013.01)

(58) Field of Classification Search
CPC ....... G02B 7/021; G02B 7/025; H04N 5/2254
USPC .................................................. 359/811–830
See application file for complete search history.

(56) References Cited

U.S. PATENT DOCUMENTS

| 8,305,867 | B2 * | 11/2012 | Hanashiro | ................ | G11B 7/22 369/112.23 |
| 2009/0244726 | A1 | 10/2009 | Sakai et al. | | |
| 2011/0069198 | A1 * | 3/2011 | Ezawa | ................... | G02B 7/025 348/222.1 |
| 2011/0299180 | A1 * | 12/2011 | Yen | ...................... | G02B 13/001 359/819 |
| 2013/0107381 | A1 | 5/2013 | Ezawa et al. | | |
| 2014/0247488 | A1 * | 9/2014 | Nagayama | ......... | B29D 11/0048 359/503 |
| 2018/0106978 | A1 * | 4/2018 | Wang | ..................... | G02B 7/023 |
| 2018/0246290 | A1 * | 8/2018 | Wang | ..................... | G02B 7/025 |
| 2018/0284398 | A1 | 10/2018 | Furutake et al. | | |
| 2019/0049693 | A1 * | 2/2019 | Wang | ..................... | G02B 7/025 |
| 2019/0346652 | A1 * | 11/2019 | Tsai | ........................ | G02B 9/60 |
| 2020/0158982 | A1 * | 5/2020 | Feng | ...................... | G02B 7/022 |
| 2020/0285029 | A1 * | 9/2020 | Watanabe | .............. | G02B 7/026 |
| 2020/0409016 | A1 * | 12/2020 | Jiang | ...................... | G02B 7/003 |
| 2021/0080677 | A1 * | 3/2021 | Kawada | .................... | G02B 7/02 |

FOREIGN PATENT DOCUMENTS

| JP | H04-257808 A | 9/1992 |
| JP | H05-113529 A | 5/1993 |
| JP | H07-113937 A | 5/1995 |
| JP | 2009-244393 A | 10/2009 |
| JP | 2009-244394 A | 10/2009 |
| JP | 2016-004233 A | 1/2016 |
| JP | 2019-074728 A | 5/2019 |

* cited by examiner

*Primary Examiner* — Mahidere S Sahle
(74) *Attorney, Agent, or Firm* — MASCHOFF BRENNAN

(57) ABSTRACT

In a lens module, a sidewall of a lens barrel includes a first wall section that surrounds at least one access hole, and a second wall section that is other than the first wall section. The first wall section has a first inner circumferential surface and a first distance defined between the first inner circumferential surface and an outer circumferential surface of the at least one lens. The second wall section has a second inner circumferential surface and a second distance defined between the second inner circumferential surface and the outer circumferential surface of the at least one lens. The first distance is larger than the second distance.

17 Claims, 8 Drawing Sheets

LENS MODULE AND VEHICULAR IMAGING DEVICE

CROSS-REFERENCE TO RELATED APPLICATION

This application is based on and claims the benefit of priority from earlier Japanese Patent Application No. 2018-237464 filed on Dec. 19, 2018, the entire disclosure of which is incorporated herein by reference.

TECHNICAL FIELD

The present disclosure relates to lens modules and vehicular imaging devices each including such a lens module.

BACKGROUND

Lens modules, which include a lens barrel and a plurality of lenses disposed in the lens barrel, are used for various imaging devices, such as cameras, in particular, vehicular imaging devices.

SUMMARY

According to an aspect of the present disclosure, there is provided a lens module. The lens module includes a lens barrel having a sidewall surrounding an optical axis thereof, at least one lens disposed in the lens barrel. The sidewall of the lens barrel includes a first wall section and a second wall section. The first wall section has a first inner circumferential surface and a first distance defined between the first inner circumferential surface and an outer circumferential surface of the at least one lens. The second wall section has a second inner circumferential surface and a second distance defined between the second inner circumferential surface and the outer circumferential surface of the at least one lens. The first distance is larger than the second distance.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

View Point

Figure 1:
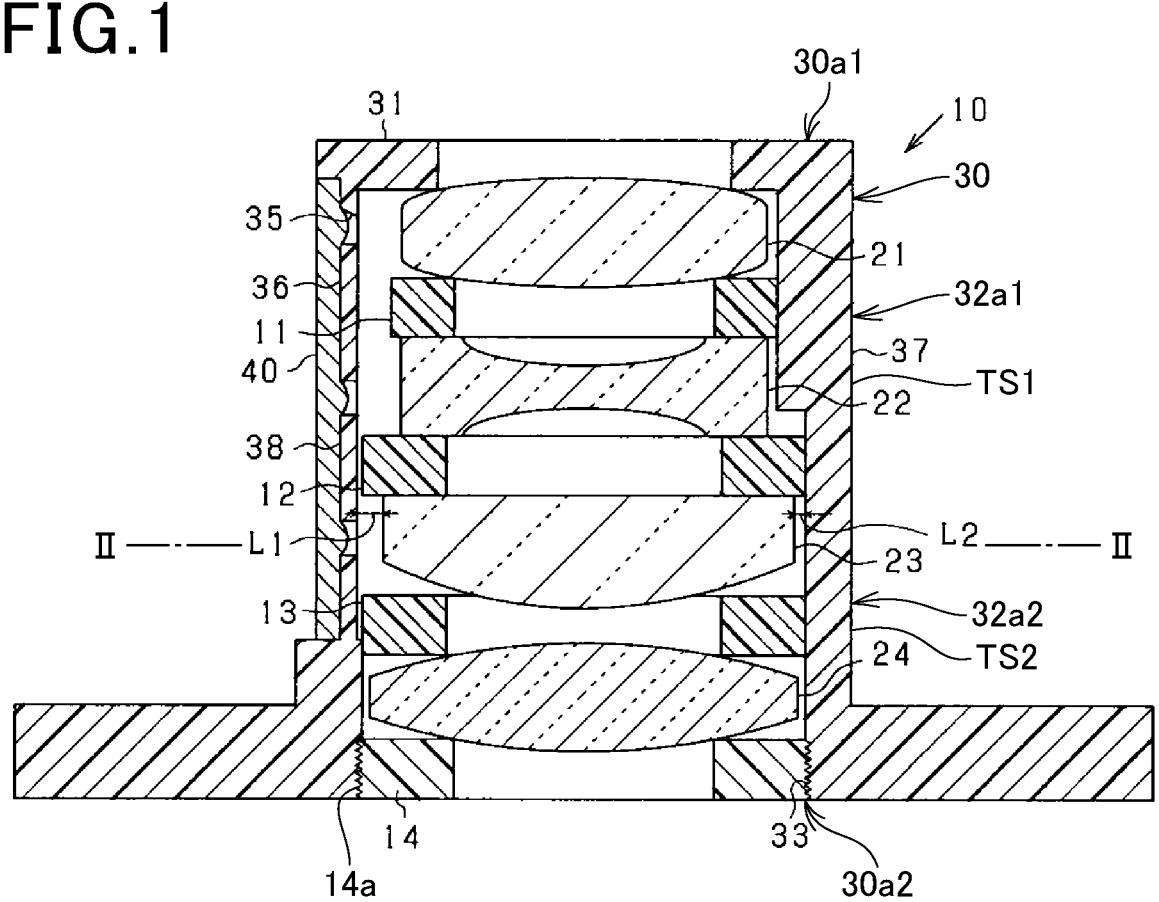
FIG. 1 is a longitudinal cross-sectional view of a lens module according to an exemplary embodiment of the present disclosure.

Lens modules, which include a lens barrel and a plurality of lenses disposed in the lens barrel, are used for various imaging devices, such as cameras, in particular, vehicular imaging devices. For avoiding, for example, misalignment of optical axes of the lenses, it is important to hold the lenses in proper alignment in the lens barrel. Various technologies have been proposed for holding a plurality of lenses to be in proper alignment in a lens barrel.

For example, there is known a technology using jigs. Specifically, the technology inserts the jigs into the lens barrel, in which the lenses have been installed, via respective through holes formed through the lens barrel, and aligns the optical axes of the lenses with each other using the jigs.

In addition, one of the technologies is disclosed in Japanese Patent Application Publication No. 2009-244393, which will be referred to as a published patent document.

The technology disclosed in the published patent document injects adhesives into the lens barrel, in which the lenses have been installed, via respective through holes formed through the lens barrel, to thereby bond the lenses to the lens barrel.

Injecting adhesives into the lens barrel via the respective through holes to fix the lenses to the lens barrel may cause a part of the adhesives to extend to an effective-aperture region of at least one of the lenses. This may result in a reduction in the performance of one or more lenses.

In addition, sealing each through hole with a sealing material or sealant may result in a part of the seal material adhering to at least one of the lenses. If such a lens module having through holes each sealed with a seal material is installed in a vehicle, a part of the seal material adhering to at least one of the lenses may cause cracks in the at least one of the lenses due to, for example, the difference in linear expansion coefficient between the seal material and the at least one of the lenses.

In view of the circumstances set forth above, an aspect of the present disclosure seeks to provide lens modules and imaging devices, each of which is capable of preventing deterioration in performance of each lens while making alignment of lenses more easily.

According to an exemplary aspect of the present disclosure, there is provided a lens module. The lens module includes a lens barrel having a sidewall surrounding an optical axis thereof, at least one lens disposed in the lens barrel, and at least one access hole formed through the sidewall for enabling external access into the lens barrel. The lens module includes a seal member configured to close the at least one access hole. The tubular sidewall of the lens barrel includes a first wall section that surrounds the at least one access hole, and a second wall section that is other than the first wall section. The first wall section has a first inner circumferential surface and a first distance defined between the first inner circumferential surface and an outer circumferential surface of the at least one lens. The second wall section has a second inner circumferential surface and a second distance defined between the second inner circumferential surface and the outer circumferential surface of the at least one lens. The first distance is larger than the second distance.

This configuration restricts a part of the seal member, which closes the at least one access hole, from entering the inside of the lens barrel and reaching the outer circumferential surface of the at least one lens. This entry of a part of the seal member may be based on, for example, capillary action. This therefore prevents cracks in the at least one lens and/or in a coating material of the at least one lens if the at least one lens is coated with the coating material.

Embodiment

The following describes an exemplary embodiment of the present disclosure with reference to the accompanying drawings.

The following describes a vehicular imaging device 100 according to the exemplary embodiment with reference to FIGS. 1 to 7 and 10.

Figure 10:
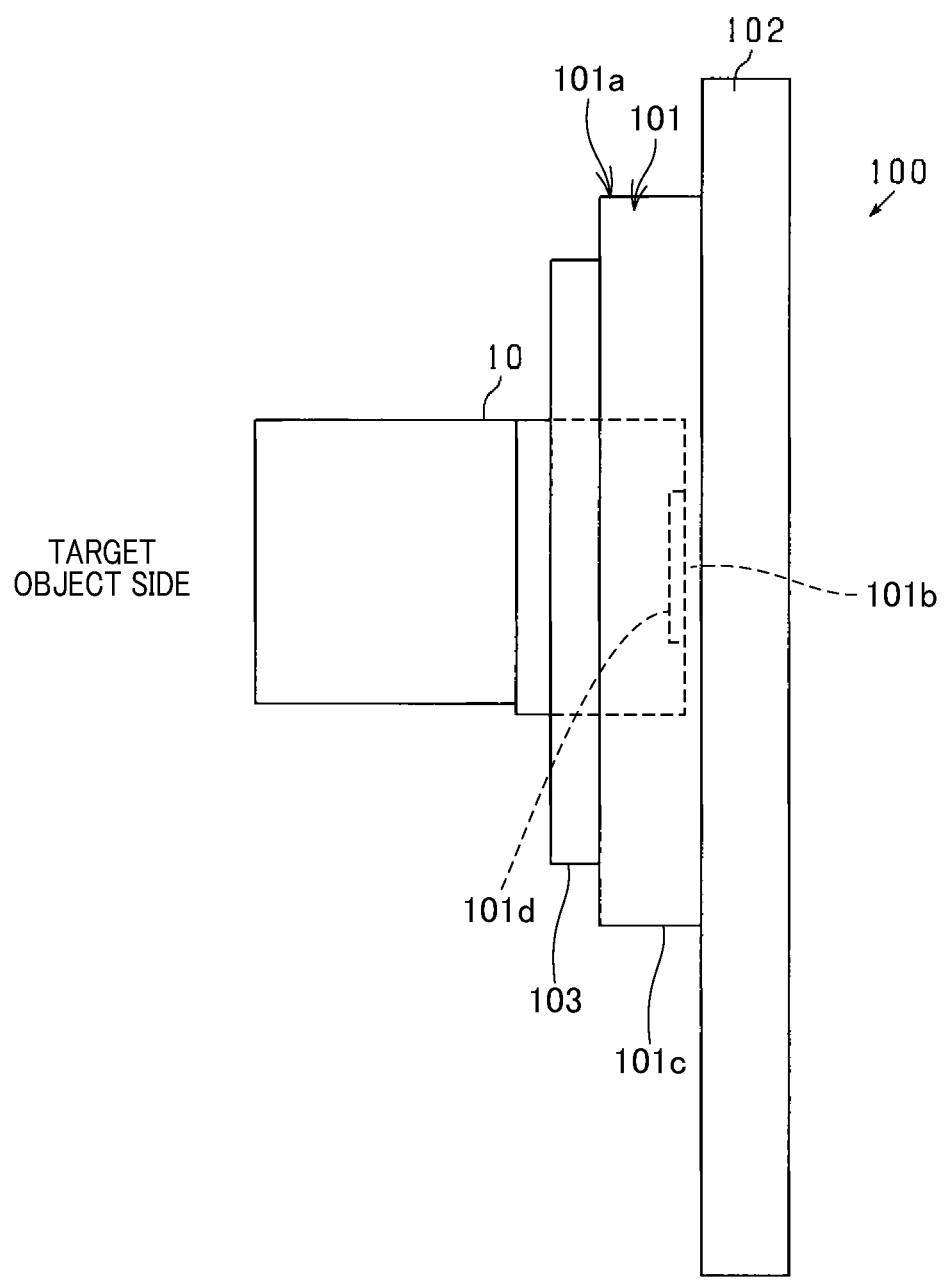
FIG. 10 is a side view of a vehicular imaging device according to the exemplary embodiment.

Referring to FIG. 10, the vehicular imaging device 100 installed in a vehicle includes a lens module 10, an imaging unit 101, a mount member 102, and a lens support 103. Note that the vehicular imaging device 100 has a predetermined field of view. In FIG. 10, the left direction corresponds to the front direction of the vehicle, and the right direction corresponds to the rear direction of the vehicle.

The mount member 102 for example has a rectangular plate-like shape having opposing first and second major surfaces, and is mounted to a vehicular body of the vehicle such that the vehicular imaging device 100 is arranged close to the center of the upper portion of the inner surface of a front windshield, and the first major surface of the mount member 102 is directed to the front of the vehicle.

The imaging unit 101 includes, for example, a housing 101a having a substantially tubular shape, i.e. a hollow cylindrical shape, with a substantially circular bottom wall 101b and a substantially tubular sidewall 101c. The housing 101a is mounted at an outer surface of its bottom wall 101b on the first major surface of the mount member 102.

The imaging unit 101 includes a color image sensor 101d, such as a known charge-coupled device (CCD) image sensor or a complementary metal-oxide-semiconductor (CMOS) image sensor. The color image sensor is mounted on an inner surface of the bottom wall 101b, and is comprised of a plurality of light receiving elements, which respectively correspond to a plurality of pixels, two-dimensionally arranged in both vertical and horizontal directions corresponding to the respective height direction and width direction of the vehicle. The two-dimensionally arranged pixels constitute a light receiving surface of the color image sensor 101d.

The lens support 103 has a substantially follow cylindrical shape. The lens support 103 is configured to support the lens module 10 to thereby locate the lens module 10 at a predetermined position such that the lens module 10 is aligned with the color image sensor 101d, and the inner chamber of the lens module 10 communicates with the inner space of the housing 101a. This makes it possible to focus light incident through the lens module 10 on the light receiving surface of the color image sensor 101d as an image.

The lens module 10 includes a lens unit 10a and a lens-barrel 30 for holding the lens unit 10a. The lens barrel 30 has a substantially hollow cylindrical or tubular outline, and has opposing circular first and second ends 30a1 and 30a2 each with a circular opening. Each of the first and second ends 30a1 and 30a2 has a center aligned with a center axis, i.e. an optical axis, of the lens barrel 30. The circular first end 30a1 is arranged to be closer to the front end of the vehicle than to the rear end of the vehicle, and the circular second end 30a2 is arranged to be closer to the rear end of the vehicle than to the front end of the vehicle.

The lens module 10 of the vehicular imaging device 100 has a field of view directed to the front of the vehicle via the circular first end 30a1.

The vehicular imaging device 100 is configured such that the lens module 10 focuses light incident from, for example, the front of the vehicle on the light receiving surface of the color image sensor 101d as an image including one or more target object to be captured. The color image sensor 101d receives light focused on the light receiving surface thereof as an image, so that each of the two-dimensionally arranged light-sensitive elements (pixels) receives a corresponding light component.

Then, the color image sensor 101d converts, using each of the light receiving elements, the intensity or luminance level for each of red, green, and blue (RGB) of a corresponding received light component into an analog pixel value or an analog pixel signal that is proportional to the luminance level of the corresponding received light component; the analog pixel values of all the pixels, i.e. light receiving elements, constitute an analog frame image.

The imaging unit 101 or an unillustrated ECU is configured to convert the analog pixel signals (analog pixel values) of the analog frame image into digital pixel signals (digital pixel values) based on a predetermined bit width, i.e. the number of bits, thus obtaining a digital frame image comprised of two-dimensionally arranged pixels, each of which has a corresponding digital pixel value. The imaging unit 101 is configured to, for example, cyclically obtain the digital frame image, and the digital frame images can be used by the ECU for obtaining, for example, lane marker information indicative of lane markers of a road on which the vehicle is travelling and/or environment information indicative of information around the vehicle.

FIG. 1 schematically illustrates a longitudinal cross-sectional view of the lens module 10.

Specifically, the lens unit 10a includes first to fourth glass lenses 21 to 24, each of which is made of, for example, glass, and has, for example, a substantially circular plate-like shape.

Each of the lenses 21 to 24 has an optical axis. Each of the lenses 21 to 24 has opposing first and second major surfaces, and each of the first and second major surfaces is comprised of a spherical or aspherical optical aperture region that has one or more optical effects, and a non-optical outer periphery located to surround the optical aperture region. Each of the first and second major surfaces can be comprised of no non-optical outer peripheries, so that each of the first and second major surfaces can be comprised of only an optical aperture region.

The lens barrel 30 is comprised of a substantially hollow cylindrical or tubular shape in which the first to fourth lenses 21 to 24 are disposed in proper alignment in this order from the front to the rear of the lens barrel 30. That is, the optical axes of the respective first to fourth lenses 21 to 24 installed in the lens barrel 30 are aligned with each other.

The lens barrel 30 is made of, for example, a relatively hard resin material. The lens barrel 30 has formed a latch wall 31 at the front end 30a1 thereof; the latch wall 31 projects inwardly from the inner surface of the first end 30a1 of the lens barrel 30 toward the optical axis of the lens barrel 30. The lens barrel 30 can be made of another hard material, such as metal.

The first lens 21 is designed as, for example, a biconvex lens, and has the opposing first and second major surfaces including the respective effective aperture regions. The first lens 21 is disposed such that the first major surface abuts on the inner edge of the latch wall 31 of the lens barrel 30 in alignment with the optical axis of the lens barrel 30.

The second lens 22 is designed as, for example, a biconcave lens, and has the opposing first and second major surfaces including the respective effective aperture regions; the first major surface, i.e. the front major surface, faces the second major surface of the first lens 21. The second lens 22 is disposed behind the first lens 21 to be coaxial with the first lens 21 with a predetermined interval between a center of the first lens 21 and a center of the second lens 22.

The third lens 23 is designed as, for example, a planoconvex lens, and has the opposing first and second major surfaces including the respective effective aperture regions; the first major surface, i.e. the front major surface, is shaped as a planer shape that faces the second major surface of the second lens 22, and the second major surface, i.e. the rear major surface, is convex toward the rear direction of the vehicle. The third lens 23 is disposed behind the second lens 22 to be coaxial with the second lens 22 with a predetermined interval between a center of the second lens 22 and a center of the third lens 23.

The fourth lens 24 designed as, for example, a biconvex lens, and has the opposing first and second major surfaces; the first major surface, i.e. the front major surface, faces the second major surface of the third lens 23. The fourth lens 24 is disposed behind the third lens 23 to be coaxial with the third lens 23 with a predetermined interval between a center of the third lens 23 and a center of the fourth lens 24.

Each of the first and second lenses 21 and 22 has an outer diameter, i.e. an outer radial diameter, shorter than an outer diameter of the each of the third and fourth lenses 23 and 24. The number of lenses in the lens barrel 30 and/or the combination of types of lenses in the lens barrel 30 can be freely changed depending on desired optical effects of the lens module 10. For example, resin lenses can be used as the respective first to fourth lenses 21 to 24, or glass and resin lenses can be used as the first to fourth lenses.

The lens module 10 also includes a first spacer 11, a second spacer 12, and a third spacer 13. Each of the first to third spacers 11 to 13 has a substantially hollow cylindrical shape, and is made of, for example, a relatively hard resin material. Each of the first, second, and third spacers 11 to 13 has opposing annular front and rear surfaces.

The first spacer 11 is disposed in the lens barrel 30 to be interposed between the first and second lenses 21 and 22. For example, the first spacer 11 is arranged such that 1. An inner periphery of the annular front surface of the first spacer 11 abuts on the second major surface of the first lens 21
2. An inner periphery of the annular rear surface of the first spacer 11 abuts on the first major surface of the second lens 22

This enables the center of the first lens 21 and the center of the second lens 22 to be separated from each other.

The second spacer 12 is disposed in the lens barrel 30 to be interposed between the second and third lenses 22 and 23. For example, the second spacer 12 is arranged such that 1. An inner periphery of the annular front surface of the second spacer 12 abuts on an outer periphery of the second major surface of the second lens 22
2. An inner periphery of the annular rear surface of the second spacer 12 abuts on the first major surface of the third lens 23

This enables the center of the second lens 22 and the center of the third lens 23 to be separated from each other.

The third spacer 13 is disposed in the lens barrel 30 to be interposed between the third and fourth lenses 23 and 24. For example, the third second spacer 12 is arranged such that 1. An inner periphery of the annular front surface of the third spacer 13 abuts on the second major surface of the third lens 23
2. An inner periphery of the rear surface of the third spacer 13 abuts on the first major surface of the annular fourth lens 24

This enables the center of the third lens 23 and the center of the fourth lens 24 to be separated from each other.

The first spacer 11 has a predetermined shape and a predetermined size that disable the first spacer 11 from covering the effective aperture region of the second major surface of the first lens 21, and disable the first spacer 11 from covering the effective aperture region of the first major surface of the second lens 22.

Similarly, the second spacer 12 has a predetermined shape and a predetermined size that disable the second spacer 12 from covering the effective aperture region of the second major surface of the second lens 22, and disable the second spacer 12 from covering the effective aperture region of the first major surface of the third lens 23.

The third spacer 13 has a predetermined shape and a predetermined size that disable the third spacer 13 from covering the effective aperture region of the second major surface of the third lens 23, and disable the third spacer 13 from covering the effective aperture region of the first major surface of the fourth lens 24.

Note that the first spacer 11 has an outer diameter, i.e. an outer radial diameter, shorter than an outer diameter of the each of the second and third spacers 12 and 13. The outer diameter of the first spacer 11 is slightly larger than the outer diameter of each of the first and second lenses 21 and 22. Each of the second and third spacers 12 and 13 has an outer diameter, and the outer diameter of each of the second and third spacers 12 and 13 is slightly larger than the outer diameter of each of the third and fourth lenses 23 and 24.

The lens barrel 30 has a substantially constant outer diameter from the first end 30a1 to the second end 30a2.

Specifically, the lens barrel 30 is comprised of a first barrel portion 32a1 and a second barrel portion 32a2 located to be closer to the rear end of the vehicle than the first barrel portion 32a1 is.

The first barrel portion 32a1 includes a tubular sidewall TS1 that has formed therein a substantially cylindrical inner chamber, in which the first lens 21, the first spacer 11, and the second lens 23 are installed, having first and second inner diameters. The tubular sidewall TS1 surrounds the optical axis of the first barrel portion 32a1. The first barrel portion 32a1 has opposing front and rear ends, each of which has an opening. The front end of the first barrel portion 32a1 corresponds to the circular first end 30a1 of the lens barrel 30.

The second barrel portion 32a2 includes a tubular sidewall TS2 that has formed therein a substantially cylindrical inner chamber, in which the third lens 23, the second spacer 12, the third lens 23, the third spacer 13, and the fourth lens 24 are installed, having first and second inner diameters. The tubular sidewall TS2 surrounds the optical axis of the second barrel portion 32a2.

The second barrel portion 32a2 has opposing front and rear ends, and is continuously arranged from the second end of the first barrel portion 32a1 to extend toward the rear end of the vehicle to be in alignment with each other. The rear end of the second barrel portion 32a2 corresponds to the circular second end 30a2 of the lens barrel 30.

The tubular sidewall TS1 of the first barrel portion 32a1 and the tubular sidewall TS2 of the second barrel portion 32a2 constitute a whole sidewall TS of the lens barrel 30.

The first barrel portion 32a1 serves as a diameter reduction portion to have an average inner diameter shorter than an average inner diameter of the second barrel portion 32a2. In other words, the second barrel portion 32a2 serves as a diameter expansion portion to have the average inner diameter larger than the average inner diameter of the first barrel portion 32a1.

As described above, because the outer radial dimension of each of the first lens 21, the second lens 22, and the first spacer 11 is smaller than the outer radial dimension of each of the third lens 23, the fourth lens 24, the second spacer 12, and the third spacer 13, the first barrel portion 32a1 for housing therein these components 21, 22, and 11 has the smaller radial dimension. This makes it possible to contain these components 21, 22, and 11 with less wobbling.

The lens module 10 includes an internal, i.e. a female, thread member 33 helically formed on an inner circumferential surface of the second end 30a2 of the lens barrel 30 along the axial direction of the lens barrel 30. The female thread member 33 is located to be closer to the rear end of the vehicle than the fourth lens 24 is.

The lens module 10 also includes a press member 14 that has a substantially hollow cylindrical shape, and is made of, for example, the same resin material as the resin material of the first lens barrel 11.

The press member 14 has opposing front and rear surfaces, and includes an external, i.e. a male, thread member 14a helically formed on an outer circumferential surface thereof in an axial direction thereof.

The press member 14 has a predetermined shape and a size in its radial direction designed to conform with a shape and a size of the opening of the second end 30a2.

That is, while the press member 14 is installed in the second end 30a2 of the lens barrel 30 with the external thread member 14a being completely meshed with the internal thread member 33, the inner periphery of the annular front surface of the press member 14 abuts on the outer periphery of the second major surface of the fourth lens 24 while preventing the press member 14 from covering the optically effective portion of the second major surface of the fourth lens 24.

Figure 2:
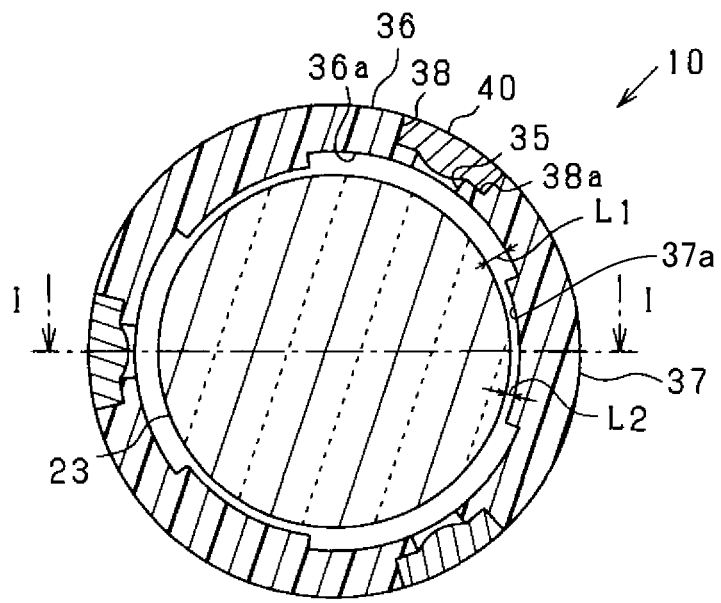
FIG. 2 is a lateral cross-sectional view taken along a line II-II shown in FIG. 1.

Referring to FIGS. 1 and 2, the tubular sidewall TS1 of the first barrel portion 32a1 has a first set of access holes, i.e. through holes, 35 radially formed therethrough; the access holes 35 of the first set are arranged to face the outer circumferential surface of the first lens 21. Similarly, the tubular sidewall TS1 of the first barrel portion 32a1 has a second set of access holes 35 radially formed therethrough; the access holes of the second set are arranged to face the outer circumferential surface of the second lens 22.

Additionally, the tubular sidewall TS2 of the second barrel portion 32a2 has a third set of access holes 35 radially formed therethrough; the access holes 35 of the third set are arranged to face the outer circumferential surface of the third lens 23.

Next, the following describes an example of the structure of a predetermined portion of the second barrel portion 32a2, which includes the access holes 35 of the third set, with referenced to FIG. 2.

FIG. 2 is a lateral cross-sectional view taken along line II-II, which crosses through the access holes 35 of the third set, in FIG. 1. Note that the structure of a predetermined portion of the first barrel portion 32a1, which includes the access holes of the first set and the structure of a predetermined portion of the first barrel portion 32a1, which includes the access holes of the second set, are each substantially the same as the structure of the predetermined portion of the second barrel portion 32a2, which includes the access holes 35 of the third set. For this reason, descriptions of the predetermined portion of the first barrel portion 32a1, and descriptions of the predetermined portion of the second barrel portion 32a2 are omitted. Additionally, illustration of the predetermined portion of each of the first and second barrel portions 32a1 and 32a2 is omitted.

Note that line I-I shown in FIG. 2 represents a position of the longitudinal cross section of the lens module 10 illustrated in FIG. 1.

As described above, each of the access holes 35 of the third set formed through the tubular sidewall TS2 of the second barrel portion 32a2 is located to face the outer circumferential surface of the third lens 23. For example, the number of access holes 35 of each of the first to third sets is set to three, and the three access holes 35 of each of the first to third sets have regular internals from one another thereamong.

The three access holes 35 of the first set are respectively aligned with the corresponding three access holes 35 of the second set in the optical-axis direction of the lens barrel 30. Similarly, the three access holes 35 of the second set are respectively aligned with the corresponding three access holes 35 of the third set in the optical-axis direction of the lens barrel 30.

Each access hole 35 has a predetermined dimension, such as a predetermined diameter, designed to permit a working end of any of positioning jigs J described later (see FIG. 5) to be inserted therethrough.

Note that the number of access holes 35 of each of the first to third sets formed in a circumferential direction of the lens barrel 30 is preferably set to be three or more. The access holes 35 of each of the first to third sets formed in a circumferential direction of the lens barrel 30 can have irregular intervals thereamong.

No access holes are formed through the tubular sidewall TS2 of the second barrel portion 32a2 to surround the outer circumferential surface of the fourth lens 24, because positioning of the fourth lens 24 can be carried out through the opening of the second end 30a2 of the lens barrel 30, but access holes can be formed through the tubular sidewall TS2 of the second barrel portion 32a2 to surround the outer circumferential surface of the fourth lens 24.

The tubular sidewall TS2 of the second barrel portion 32a2 is comprised of plural first wall sections 36 each located to surround the corresponding one of the access holes 35, and plural second wall sections 37 that are other than the first wall sections 36. Each of the second wall sections 37 is located to be interposed between a corresponding pair of adjacent first wall sections 36. Each of the first wall sections 35 has an inner circumferential surface 36a, and each of the second wall sections 36 has an inner circumferential surface 36b.

The inner circumferential surface 36a of each of the first wall sections 36 has a predetermined first radius of curvature relative to the center O of the lens barrel 30 along a predetermined axial cross section, and the inner circumferential surface 37a of each of the second wall sections 37 has a predetermined second radius of curvature relative to the center O of the lens barrel 30 along the same axial cross section. The first radius of the inner circumferential surface 36a is set to be longer than the second radius of the inner circumferential surface 36b.

That is, a first distance, i.e. a first minimum distance, L1 between the outer circumferential surface of the third lens 23 and the inner circumferential surface 36a of each first wall section 36 is set to be longer than a second distance, i.e. a second minimum distance, L2 between the outer circumferential surface of the third lens 23 and the inner circumferential surface 37a of each second wall section 37. That is, the inner circumferential surface 36a of each first wall section 36 serves as n radius expansion surface.

Note that the first distance L1 is defined as the distance of a line connecting between a lens point of the outer circumferential surface of the third lens 23 and a barrel point of the inner circumferential surface 36a of each first wall section 36; the barrel point radially faces the lens point.

The second distance L2 is defined as the distance of a line connecting between a lens point of the outer circumferential surface of the third lens 23 and a barrel point of the inner circumferential surface 37a of each second wall section 37; the barrel point radially faces the lens point.

This feature of the first distance L1 being longer than the second distance L2 can be satisfied for each of the first lens 21 and the second lens 22.

Each second wall section 37 of the tubular sidewall TS2 for the third lens 23 works to restrict access of the third lens 23 to each access hole 35 while localizing the third lens 23. This feature of each second wall section 37 can be satisfied for each of the first and second lenses 21 and 22.

Each first wall section 36 of the tubular sidewall TS2 for the third lens 23 is configured to have the radius expansion surface 36a whose radius of curvature is longer than the radius of curvature of the inner circumferential surface 37a.

This configuration enables the first distance L1 between the outer circumferential surface of the third lens 23 and the inner circumferential surface 36a of each first wall section 36 to be different from the second distance L2 between the outer circumferential surface of the third lens 23 and the inner circumferential surface 37a of each second wall section 37 without deforming the third lens 23. This feature of each first wall section 36 can be satisfied for each of the first and second lenses 21 and 22.

The inner radius of each second wall section 37 is set to be equal to or longer than an outer radius of each of the spacers 11 to 13. This makes it possible for the second wall sections 37 to hold each of the spacers 11 to 13 without wobbling.

In addition, the third lens 23 is disposed in the second barrel portion 32a2 to provide a predetermined space between the outer circumferential surface of the third lens 23 and the inner circumferential surface 37a of each second wall section 37; this space enables the third lens 23 to be radially movable for optical-axis adjustment, i.e. eccentric adjustment, of the third lens 23. This feature can be satisfied for the fourth lens 24.

Similarly, the first lens 21 is disposed in the first barrel portion 32a1 to provide a predetermined space between the outer circumferential surface of the first lens 21 and the inner circumferential surface 37a of each second wall section 37; this space enables the first lens 21 to be radially movable for optical-axis adjustment of the first lens 21. This feature can be satisfied for the second lens 22.

The inner circumferential surface 36a of each of the first wall sections 36 has a predetermined first circumferential length in a circumferential direction thereof, and the inner circumferential surface 37a of each of the second wall sections 37 has a predetermined second circumferential length in a circumferential direction thereof. The first circumferential length is set to be larger than the second circumferential length. This enables a space between the outer circumferential surface of the third lens 23 and the inner circumferential surface 37a of each second wall section 37 to be sufficiently longer. This would reduce adhesion of a sealing member 40 described later to at least one of the first to fourth lenses 21 to 24 even if the sealing member 40 leaked through the access holes 35 into the inner chamber of the lens barrel 30.

Each of the first and second lenses 21 and 22 is smaller in its outer diameter than the third lens 23. For this reason, a radial thickness of each second wall section 37 of the tubular sidewall TS1 of the first barrel portion 32a1 is set to be longer than a radius thickness of each second wall section 37 of the tubular sidewall TS2 of the second barrel portion 32a2 (see FIG. 1), so that the outer diameter of the first spacer 11 disposed in the first barrel portion 32a1 is set to be shorter than the outer diameter of each of the second and third spacers 12 and 13 disposed in the second barrel portion 32a2.

In contrast, the inner surface of each first wall section 36 of the tubular sidewall TS1 of the first barrel portion 32a1 is flush with the inner surface of the corresponding first wall section 36 of the tubular sidewall TS2 of the second barrel portion 32a2 in the optical-axis direction of the lens barrel 30. That is, the radial thickness of each first wall section 36 of the tubular sidewall TS1 of the first barrel portion 32a1 is equal to the radial thickness of the corresponding first wall section 36 of the tubular sidewall TS2 of the second barrel portion 32a2. This enables the radial depth of the access hole 35 formed through each first wall section 36 of the tubular sidewall TS1 of the first barrel portion 32a1 to be equal to the radial thickness of the access hole 35 formed through the corresponding first wall section 36 of the tubular sidewall TS2 of the second barrel portion 32a2.

The first distance L1 between the outer circumferential surface of the first or second lens 21 or 22 and the inner circumferential surface 36a of each first wall section 36 of the tubular sidewall TS1 of the first barrel portion 32a1 is larger than the first distance L1 between the outer circumferential surface of the third lens 23 and the inner circumferential surface 36a of each first wall section 36 of the tubular sidewall TS2 of the second barrel portion 32a2.

Figure 4:
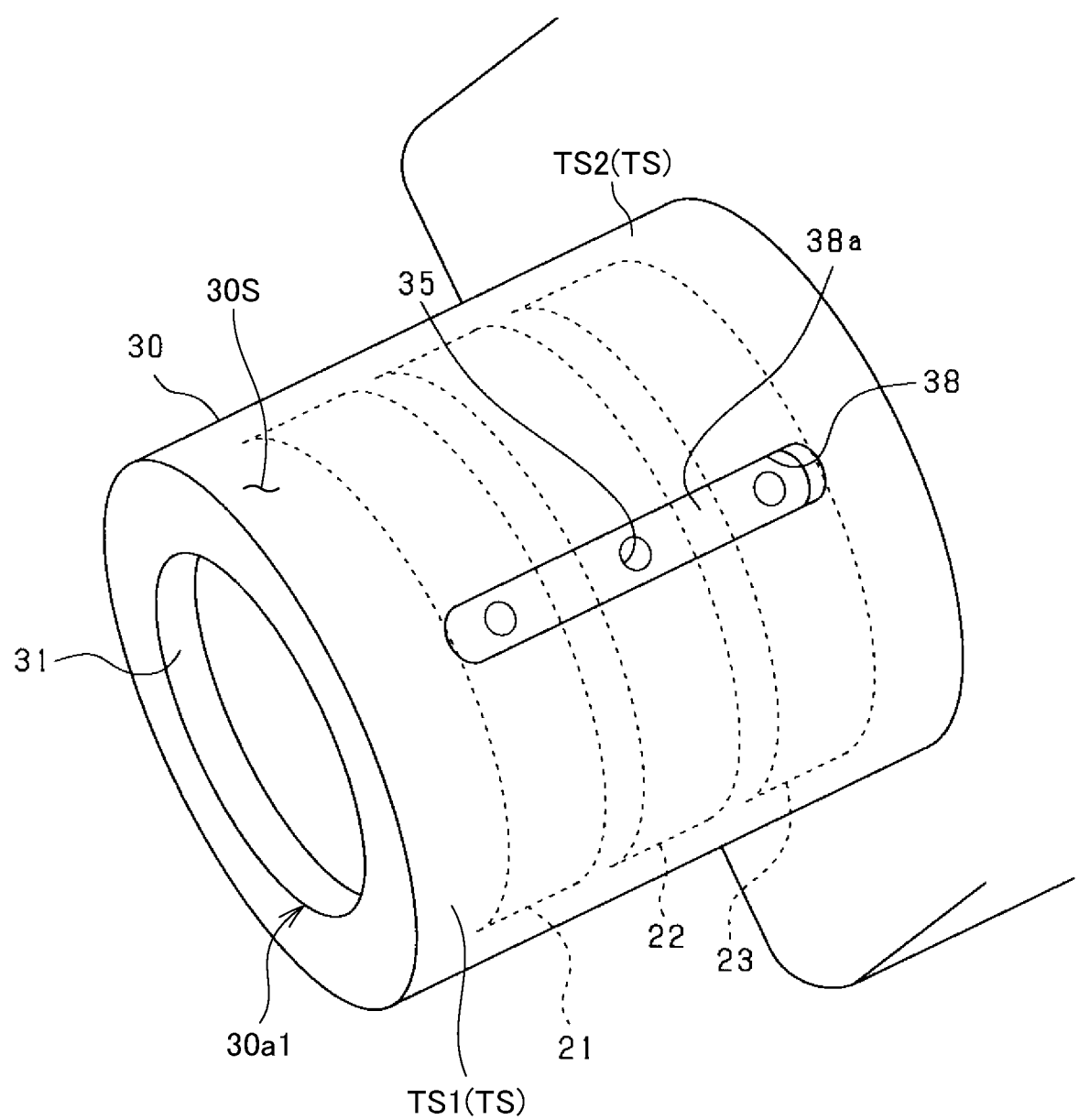
FIG. 4 is a perspective view of the lens module, which schematically illustrates a situation where the first to fourth lenses are temporarily fixed in the lens barrel.

Referring to FIG. 4, the whole sidewall TS of the lens barrel 30 has an outer surface 30S, and the whole sidewall TS of the lens barrel 30 includes first to third concave recesses 38 each formed in the outer surface 30S; each of the first to third concave recesses 38 extends in the optical-axis direction of the lens barrel 30 from a start portion that faces the outer circumferential surface of the first lens 21 to an end portion that faces the outer circumferential surface of the third lens 23. Each of the first to third concave recesses 38 has a flat bottom 38a. Through the flat bottom 38a of each concave recess 38, the access holes 35, which corresponds to the respective first to third lenses 21 to 23, of the corresponding one of the first to third sets are formed.

That is, each of the first to third concave recesses 38 extends in the optical-axis direction of the lens barrel 30 to join the access holes 35 of the corresponding one of the first to third sets.

The lens barrel 30 includes a sealing member 40 that seals at least each of the first to third concave recesses 38. For example, the sealing member 40 in liquid form is applied to each of the first to third concave recesses 38, so that the applied sealing member 40 in liquid state becomes solidified, resulting in the sealing member 40 in a solid state sealing the corresponding one of the first to third concave recesses 38.

In particular, the sealing member 40 in liquid state, viscosity sealant, which has viscosity and a black color, is applied to each of the first to third concave recesses 38. This makes it possible to prevent external light from entering the inside of the lens barrel 30.

When the viscosity sealing member 40 in liquid state is applied to each of the first to third concave recesses 38, a part of the sealing member 40 in liquid state may enter into at least one of the access holes 35 in the corresponding one of the first to third concave recesses 38. Preferably, the quantity for application of the viscosity sealing member 40 in liquid state to each of the first to third concave recesses 38 is determined such that the sealing member 40 reliably closes, i.e. seals, the corresponding access hole 35 while being prevented from extending beyond the total length of the corresponding access hole 35. More preferably, the quantity for application of the viscosity sealing member 40 in liquid state to each of the first to third concave recesses 38 is determined such that the sealing member 40 is fitted within the corresponding one of the first to third concave recesses 38. When the sealing member 40 is fitted within each of the first to third concave recesses 38, it is possible to prevent a part of the sealing member 40 from projecting from the outer surface 30S. The sealing member 40 fitted within each of the first to third concave recesses 38 is difficult to peel off as compared with a case where a part of the sealing member 40 applied to the corresponding one of the concave recesses 38 projects from the outer surface 30S.

Figure 3:
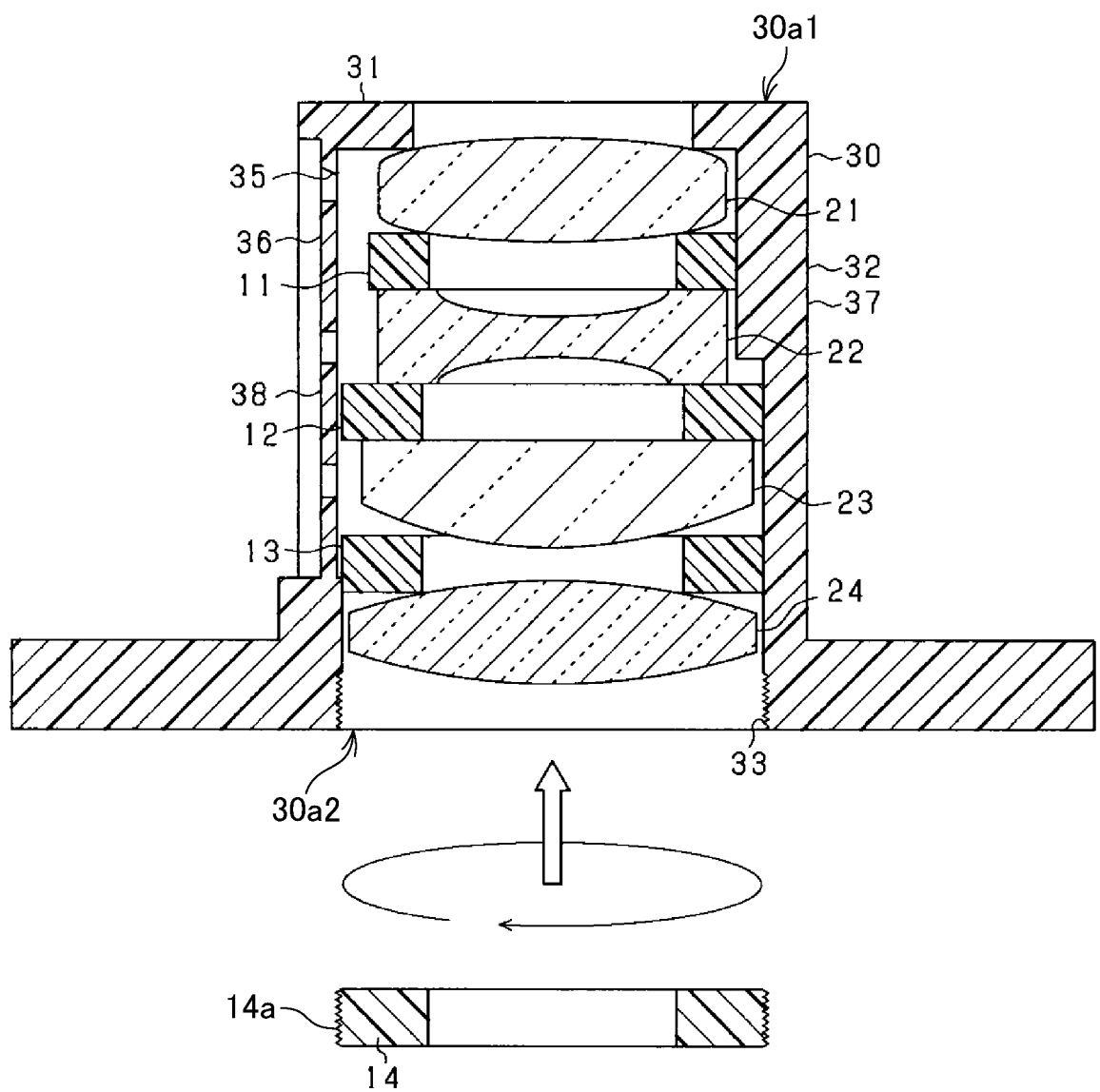
FIG. 3 is an exploded axial cross-sectional view schematically illustrating the lens module before temporarily fixing first to fourth lenses in a lens barrel.

Next, the following describes an example of the procedure of assembling the lens module 10. FIG. 3 is an exploded axial cross-sectional view schematically illustrating the lens module 10 before temporarily fixing the first to fourth lenses 21 to 24 in the lens barrel 30.

First, the first lens 21 is inserted into the lens barrel 30 such that the first major surface of the first lens 21 abuts on the inner edge of the latch wall 31 of the lens barrel 30. This enables the first lens 21 to be temporarily positioned without moving in the front direction of the vehicle.

Next, the first spacer 11 is inserted into the lens barrel 30 such that the inner periphery of the annular front surface of the first spacer 11 abuts on the second major surface of the first lens 21. Subsequently, the second lens 22 is inserted into the lens barrel 30 such that the outer periphery of the first major surface of the second lens 22 abuts on the inner periphery of the annular rear surface of the first spacer 11. This enables the second lens 22 to be temporarily positioned.

Following the insertion of the second lens 22, the second spacer 12 is inserted into the lens barrel 30 such that the inner periphery of the annular front surface of the second spacer 12 abuts on the second major surface of the second lens 22. Subsequently, the third lens 23 is inserted into the lens barrel 30 such that the outer periphery of the first major surface of the third lens 23 abuts on the inner periphery of the annular rear surface of the second spacer 12. This enables the third lens 23 to be temporarily positioned.

Next, the third spacer 13 is inserted into the lens barrel 30 such that the inner periphery of the annular front surface of the third spacer 13 abuts on the second major surface of the third lens 23. Subsequently, the fourth lens 24 is inserted into the lens barrel 30 such that the outer periphery of the first major surface of the fourth lens 24 abuts on the inner periphery of the annular rear surface of the third spacer 13. This enables the fourth lens 24 to be temporarily positioned.

After insertion of the first to fourth lenses 21 to 24 into the lens barrel 30 and temporal positioning of the lenses 21 to 24 in the lens barrel 30, the press member 14, which has formed the external thread member 14a at the outer circumferential surface thereof, is inserted into the lens barrel 30 while the front end of the external thread member 14a is engaged with the rear end of the internal thread member 33 formed on the inner circumferential surface of the second end 30a2 of the lens barrel 30.

Then, the press member 14 is screwed into the lens barrel 30 toward the front direction of the vehicle (see an arrow in FIG. 3), so that the press member 14 moves toward the fourth lens 24 while twisting. When the external thread member 14a of the press member 14 is loosely meshed with the internal thread member 33 of the lens barrel 30, the press member 14 abuts on the outer periphery of the second major surface of the fourth lens 24. This enables the press member 14 to temporarily fix the first to fourth lenses 21 to 24 using a weak force that enables each of the first to fourth lenses 21 to be radially movable in the lens barrel 30.

FIG. 4 is a perspective view of the lens module 10, which schematically illustrates a situation where the first to fourth lenses 21 to 24 are temporarily fixed in the lens barrel 30. While the first to fourth lenses 21 to 24 are temporarily fixed in the lens barrel 30, the outer circumferential surfaces of the respective first to third lenses 21 to 23 are partially exposed from the access holes 35 in each of the first to third concave grooves 38.

Figure 5:
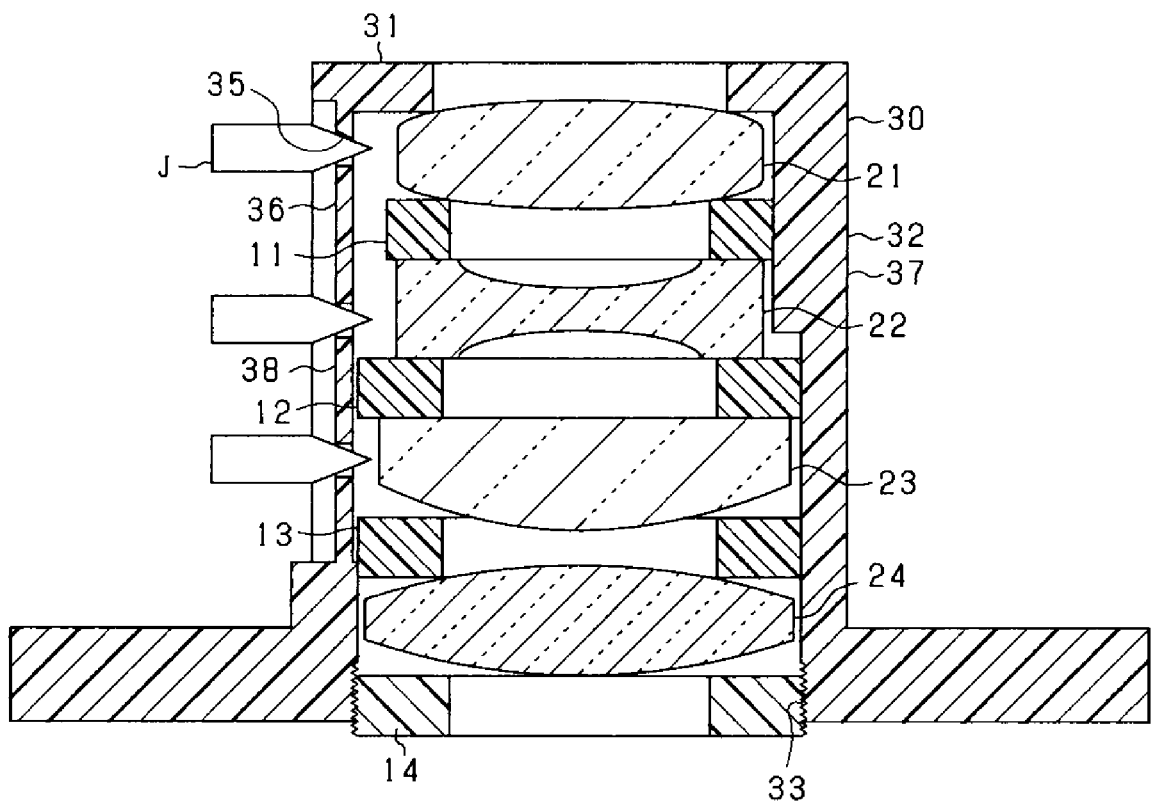
FIG. 5 is an axial cross-sectional view of the lens module in a state where the first to third lenses are adjusted using positioning jigs.
Figure 6:
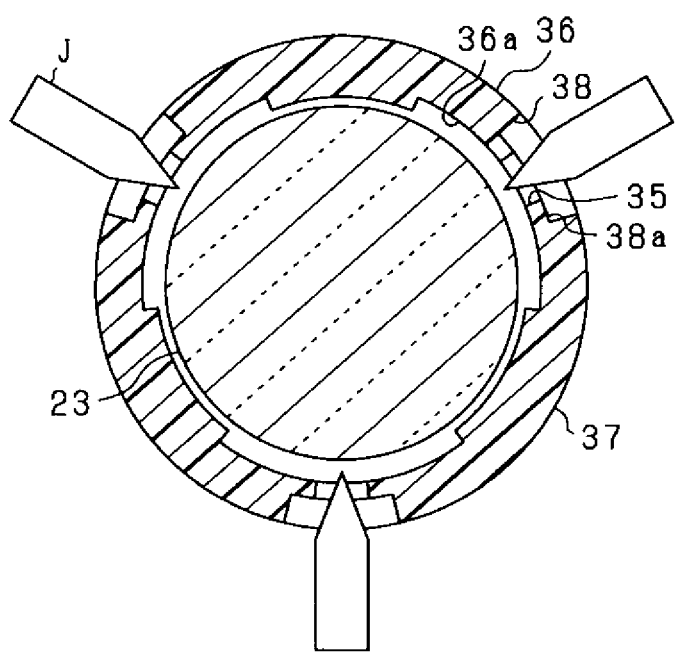
FIG. 6 is a lateral cross-sectional view of the lens module in the state where the first to third lenses are adjusted using the positioning jigs.

FIG. 5 is an axial cross-sectional view of the lens module 10 in a state where the first to third lenses 21 to 23 are adjusted using the positioning jigs J. In addition, FIG. 6 is a lateral cross-sectional view of the lens module 10 in the state where the first to third lenses 21 to 23 are adjusted using the positioning jigs J.

While the first to third lenses 21 to 23 are temporarily fixed in the lens barrel 30, the positions of the respective lenses 21 to 23 are adjusted using the respective jigs being inserted through the respective access holes 35 of each of the first to third sets such that the optical axes of the first to fourth lenses 21 to 24 are substantially identical to each other, i.e. the first to fourth lenses 21 to 24 are substantially coaxial with each other.

Specifically, the jigs J being inserted through the respective access holes 35 of the first set radially press the outer circumferential surface of the first lens 21 to thereby adjust the radial position of the optical axis of the first lens 21. Similarly, the jigs J being inserted through the respective access holes 35 of the second set radially press the outer circumferential surface of the second lens 22 to thereby adjust the radial position of the optical axis of the second lens 22.

Additionally, the jigs J being inserted through the respective access holes 35 of the third set radially press the outer circumferential surface of the third lens 23 to thereby adjust the radial position of the optical axis of the third lens 23.

In particular, the three access holes 35 are provided for each of the first to third lenses 21 to 23 in the circumferential direction, making it possible to radially shift the optical axis of the corresponding lens to a desired position.

Figure 7:
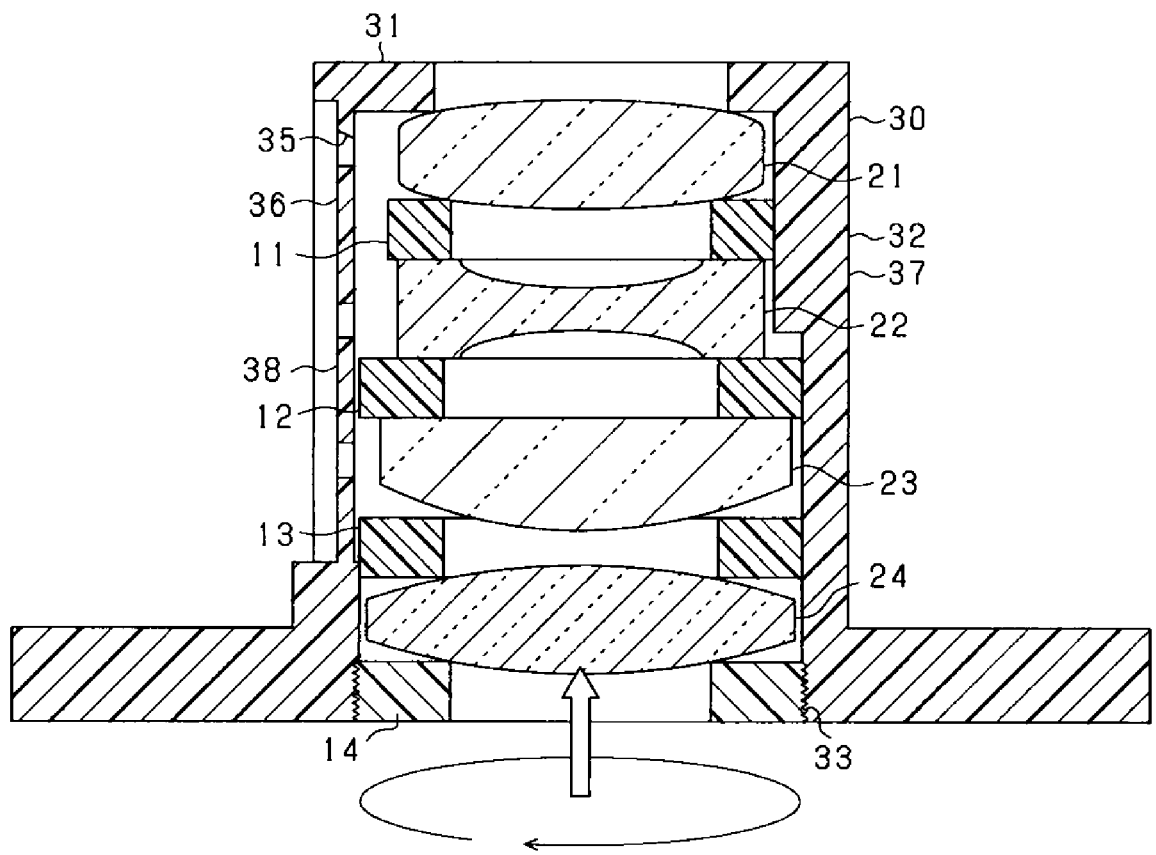
FIG. 7 is an exploded axial cross-sectional view schematically illustrating the lens module after the first to fourth lenses are finally fixed in the lens barrel.

FIG. 7 is an exploded axial cross-sectional view schematically illustrating the lens module 10 after the first to fourth lenses 21 to 24 are finally fixed in the lens barrel 30.

After the optical-axis alignment of the first to fourth lenses 21 to 24, the press member 14 is further screwed into the lens barrel 30 toward the front direction of the vehicle (see an arrow in FIG. 7), so that the press member 14 presses the fourth lens 24 toward the front direction of the vehicle. The fourth lens 24 pressed by the press member 14 presses the third spacer 13, so that the third spacer 13 presses the third lens 23 toward the front direction of the vehicle.

The third lens 23 pressed by the third spacer 13 also presses the second spacer 12, so that the second spacer 12 presses the second lens 23 toward the front direction of the vehicle.

The second lens 22 pressed by the second spacer 12 also presses the first spacer 121, so that the first spacer 11 presses the first lens 23 toward the front direction of the vehicle.

At that time, the first major surface of the first lens 21 abutting on the latch wall 31 is fixed in position by the latch wall 31 based on frictional force b between the first lens 21 and the latch wall 31.

For this reason, the first lens 21, the first spacer 11, the second lens 22, the second spacer 12, the third lens 23, the third spacer 13, the fourth lens 24, and the press member 14 are fixedly localized, i.e. fixedly positioned, in the lens barrel 30 due to frictional force between each adjacent pair of the components 21, 11, 22, 12, 23, 13, and 14.

That is, pressing the components 21, 11, 22, 12, 23, and 13 by the press member 14 while the front glass lens 21 is fixed to the latch wall 31 enables each of the first to fourth lenses 21 to 24 and the first to third spacers 11 to 13 to be located at a corresponding position in the optical-axis direction of the lens module 10.

Additionally, the first to fourth lenses 21 to 24 and the first to third spacers 11 to 13 are pushed by the press member 14 to the latch wall 31 of the lens barrel 30 in the optical-axis direction of the lens barrel 30 while 1. The first lens 21 abuts on the inner periphery of the latch wall 31

2. The first spacer 11 abuts on the second major surface of the first lens 21

3. The second lens 22 abuts on the inner periphery of the annular rear surface of the first spacer 11

4. The second spacer 12 abuts on the second major surface of the second lens 22

5. The third lens 23 abuts on the inner periphery of the annular rear surface of the second spacer 12

6. The third spacer 12 abuts on the second major surface of the third lens 23

7. The fourth lens 24 abuts on the inner periphery of the annular rear surface of the third spacer 13

8. The inner periphery of the annular front surface of the press member 14 abuts on the second major surface of the fourth lens 24

This configuration enables the first to fourth glass lenses 21 to 24 to be radially localized in the lens barrel 30 while the lenses 21 to 24 are adjusted to be aligned with each other.

Thereafter, as illustrated in FIGS. 1 and 2, the sealing member 40, which is in a liquid having viscosity, is applied to each of the first to third concave recesses 38 formed on the outer surface 30S of the lens barrel 30. At that time, the quantity for application of the sealing member 40, which is in liquid state with viscosity, to each of the first to third concave recesses 38 is determined such that the sealing member 40 reliably closes, i.e. seals, the corresponding access hole 35 while being prevented from extending beyond the total length of the corresponding access hole 35 into the inside of the lens barrel 30.

After the application of the sealing member 40, which is in the liquid state with viscosity, irradiating each sealing member 40 with ultraviolet (UV) light enables each sealing member 40 to be temporarily hardened. Thereafter, each sealing member 40 is subjected to heat, so that each sealing member 40 is completely hardened, resulting in the lens module 10 being fabricated.

In applying the sealing member 40 to each concave recess 38, the radial thickness of each second wall section 37 of the tubular sidewall TS1 of the first barrel portion 32a1 is different from the radius thickness of each second wall section 37 of the tubular sidewall TS2 of the second barrel portion 32a2. However, the radial thickness of each first wall section 36 of the tubular sidewall TS1 of the first barrel portion 32a1, which surrounds the corresponding through hole 35, is equal to the radial thickness of the corresponding first wall section 36 of the tubular sidewall TS2 of the second barrel portion 32a2, which surrounds the corresponding through hole 35. In other words, the radial length of each through hole 35 is set to be substantially identical to the radial length of each of the other through holes 35.

This configuration therefore enables management of the quantity of the sealing member 40 in each concave recess 38 to thereby prevent the sealing member 40 from extending to the inner surface of the lens barrel 30.

In particular, each concave recess 38 is comprised of the flat bottom 38a. Through the flat bottom 38a of each concave recess 38, the access holes 35, which correspond to the respective first to third lenses 21 to 23, are formed. Applying the sealing member 40 to each concave recess 38 enables the sealing member 40 to collectively close the access holes 35 in the corresponding concave recess 38. This makes it possible to easily close the access holes 35 using the sealing members 40.

Let us assume that a part of the sealing members 40 enters through an access hole 35 to extend into the inner surface of the lens barrel 30.

In this assumption, the first distance L1 between the outer circumferential surface of the third lens 23 and the inner circumferential surface 36a of each first wall section 36 is set to be longer enough to restrict adhesion of the extended sealing member 40 to the lenses 21 to 24. This therefore prevents excessive amounts of the sealing member 40 from being adhered to at least one of the first to third lenses 21 to 23.

The lens module 10 configured set forth above obtains the following benefits.

The tubular sidewall TS1 of the first barrel portion 32a1 has the first set of access holes 35 radially formed therethrough; the access holes 35 of the first set are arranged to face the outer circumferential surface of the first lens 21 and used for optical-axis alignment of the first lens 21. Similarly, the tubular sidewall TS1 of the first barrel portion 32a1 has the second set of access holes 35 radially formed therethrough; the access holes of the second set are arranged to face the outer circumferential surface of the second lens 22 and used for optical-axis alignment of the second lens 22. Additionally, the tubular sidewall TS2 of the second barrel portion 32a2 has the third set of access holes 35 radially formed therethrough; the access holes 35 of the third set are arranged to face the outer circumferential surface of the third lens 23 and used for optical-axis alignment of the third lens 23.

In particular, the first distance between the outer circumferential surface of the third lens 23 and the inner circumferential surface 36a of each first wall section 36, which surrounds the corresponding access hole 35, is set to be longer than the second distance L2 between the outer circumferential surface of the third lens 23 and the inner circumferential surface 37a of each second wall section 37.

This configuration restricts a part of the seal member 40, which seals or closes each access hole 35, from entering the inside of the lens barrel 30 so as to reach the outer circumferential surface of each of the lenses 21 to 24; this entering of a part of the seal member 40 may be based on, for example, capillary action. This therefore prevents cracks in each of the lenses 21 to 24 and/or in a coating material of each of the lenses 21 to 24 if the corresponding one of the lenses 21 to 24 is coated with the coating material.

Each first wall section 36 of the tubular sidewall TS for, for example, the first lens 21 is configured to have the radius expansion surface 36a whose radius of curvature is longer than the radius of curvature of the inner circumferential surface 37a.

This configuration enables the first distance L1 between the outer circumferential surface of the first lens 21 and the inner circumferential surface 36a of each first wall section 36 to be different from the second distance L2 between the outer circumferential surface of the first lens 21 and the inner circumferential surface 37a of each second wall section 37 without deforming the first lens 21.

The radial thickness of each first wall section 36 of the tubular sidewall TS1 of the first barrel portion 32a1, which surrounds the corresponding through hole 35, is equal to the radial thickness of the corresponding first wall section 36 of the tubular sidewall TS2 of the second barrel portion 32a2, which surrounds the corresponding through hole 35. In other words, the radial length of each through hole 35 is set to be substantially identical to the radial length of another through hole 35.

This configuration therefore enables management of the quantity of the sealing member 40 in each concave recess 38 to thereby prevent the sealing member 40 from extending to the inner surface of the lens barrel 30.

The whole sidewall TS of the lens barrel 30 has first to third concave recesses 38 each formed in the outer surface 30S; each of the first to third concave recesses 38 extends in the optical-axis direction of the lens barrel 30 from the start portion that faces the outer circumferential surface of the first lens 21 to the end portion that faces the outer circumferential surface of the third lens 23. The sealing member 40 is filled in each concave recess 38.

This configuration prevents a part of the sealing member 40 filled in each concave recess 38 from projecting from the outer surface 30S, resulting in the sealing member 40 filled within each concave recess 38 being difficult to peel off as compared with a case where a part of the sealing member 40 applied to the corresponding concave recess 38 projects from the outer surface 30S.

Each concave recess 38 has the flat bottom 38a. Through the flat bottom 38a of each concave recess 38, the access holes 35, which corresponds to the respective first to third lenses 21 to 23, of the corresponding one of the first to third sets are formed. Applying the sealing member 40 to each concave recess 38 enables the sealing member 40 to collectively close or seal the access holes 35 in the corresponding concave recess 38. This makes it possible to easily close or seal the access holes 35 using the sealing members 40.

Each sealing member 40 filled in the corresponding concave recess 38 is colored, making it possible to reduce entrance of light through the access holes 35 into the lens barrel 30.

Modifications

The present disclosure is not limited to the exemplary embodiment set forth above, and can be variously modified. One of the following modifications can be applied to the lens module 10 of the exemplary embodiment, or the combination of at least two of the following modifications can be applied to the lens module 10 of the exemplary embodiment.

The lens barrel 30 has the inner circumferential surfaces 36a and 37a that respectively have different radii of curvature, but the present disclosure is not limited thereto.

Specifically, the configuration of each of the first to third lenses 21 to 23 can be changed in place of the inner circumferential surfaces 36a and 37a that respectively have different radii of curvature.

Figure 8A:
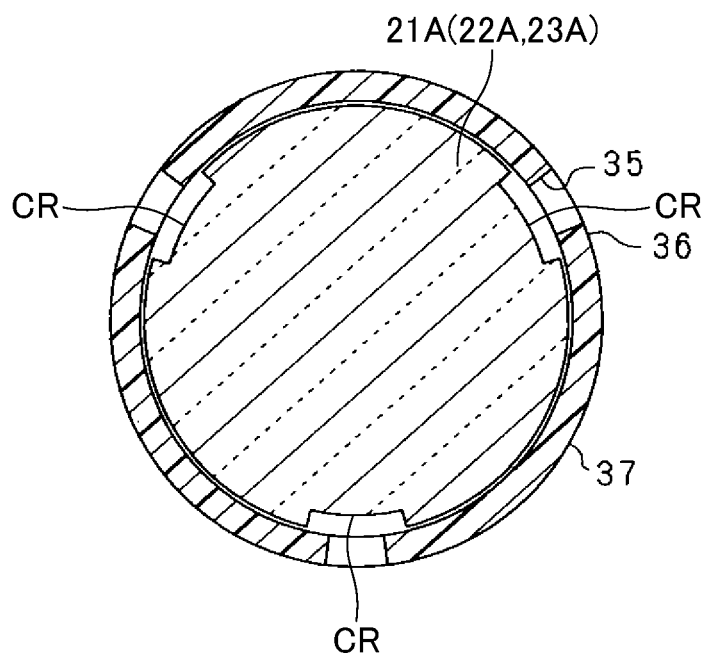
FIG. 8A is a lateral cross-sectional view of a lens module according to a modification of the exemplary embodiment.

For example, as illustrated in FIG. 8A, the outer circumferential surface of the non-optical outer edge of each of first to third lenses 21A to 23A has three concave recesses CR that respective face the access holes 35.

Figure 8B:
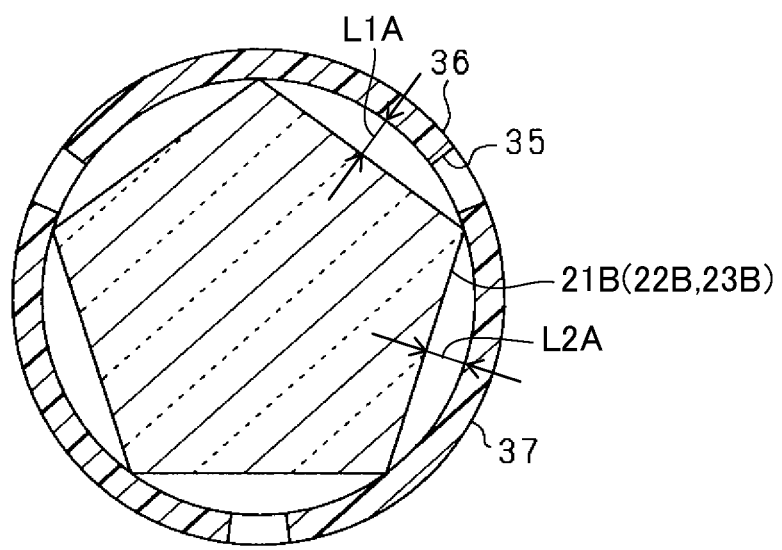
FIG. 8B is a lateral cross-sectional view of a lens module according to another modification of the exemplary embodiment.

Additionally, as illustrated in FIG. 8B, the outer circumferential surface of the non-optical outer edge of each of first to third lenses 21A to 23A can have a polygonal shape as a second modification. A first distance L1A between a selected side of each of the polygonally-shaped outer circumferential surface of each of the first to third lenses 21A to 23A and the inner circumferential surface 36a of each first wall section 36 can be set to be different from a second distance, i.e. a second distance, L2A between another selected side of the polygonally-shaped each of the first to third lenses 21A to 23A and the inner circumferential surface 36a of each first wall section 3.

The lens module 10 is configured such that the press member 14 is threadably joined to the second end 30a2 of the lens barrel 30, but the present disclosure is not limited thereto.

Figure 9A:
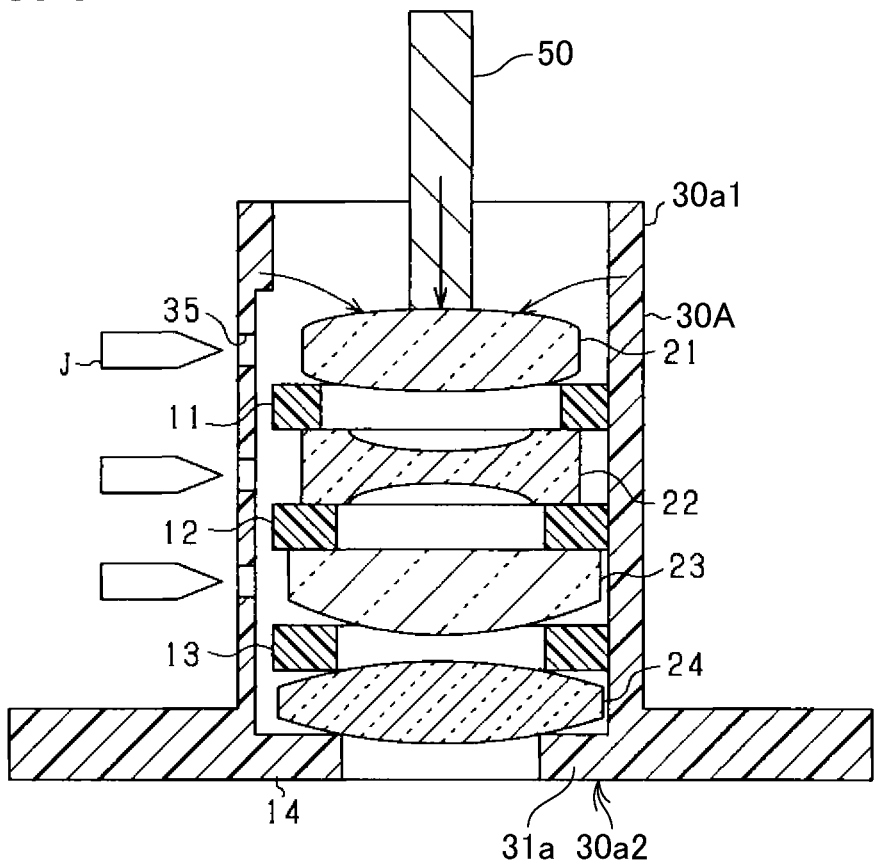
FIG. 9A is an exploded axial cross-sectional view of a lens module according to a further modification of the exemplary embodiment.
Figure 9B:
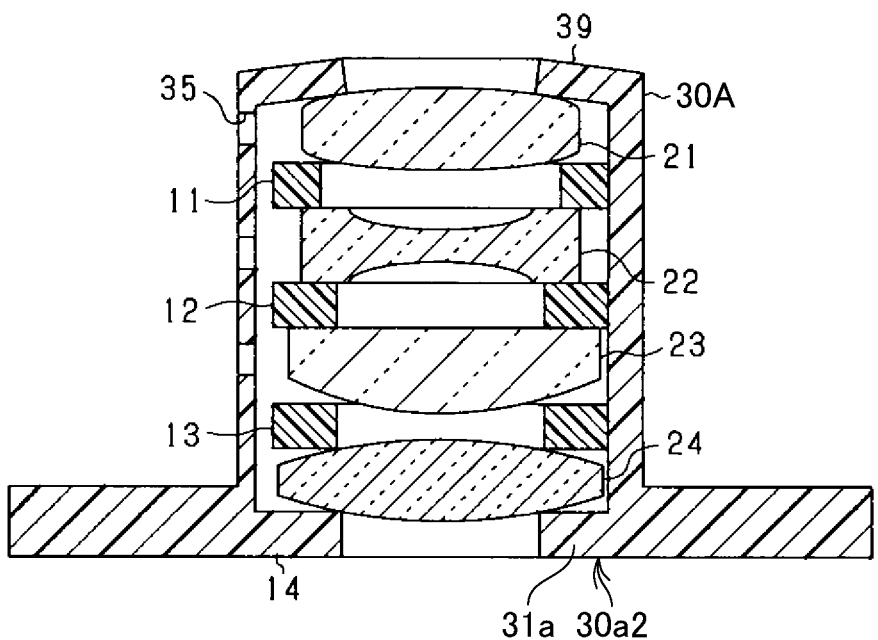
FIG. 9B is an axial cross-sectional view of the lens module according to the further modification of the exemplary embodiment.

Specifically, as illustrated in FIGS. 9A and 9B, a lens barrel 30A has formed a latch wall 31a at the rear end 30a2 thereof; the latch wall 31a projects inwardly from the inner surface of the second end 30a2 of the lens barrel 30A toward the optical axis of the lens barrel 30A.

In the lens barrel 30A, the fourth lens 24 abuts on the inner periphery of the latch wall 31a, and the third spacer 13 abuts on the first major surface of the fourth lens 24. The third lens 23 abuts on the inner periphery of the annular front surface of the third spacer 13, and the second spacer 12 abuts on the first major surface of the third lens 23.

The second lens 22 abuts on the inner periphery of the annular front surface of the second spacer 12, and the first spacer 11 abuts on the first major surface of the second third lens 23. The first lens 21 abuts on the inner periphery of the annular front surface of the first spacer 11.

Thereafter, as illustrated in FIG. 9A, a press member 50 presses the first lens 21 from the first major surface thereof toward the second 30a2 of the lens barrel 30A.

While the press member 50 presses the first lens 21 from the first major surface thereof toward the second 30a2 of the lens barrel 30A, optical-axis adjustment, i.e. eccentric adjustment, of each of the first to third lenses 21 to 23 is carried out.

After the optical-axis adjustment, the annular first end 30a1 of the lens barrel 30A is thermally swaged inwardly to press the outer periphery of the first major surface of the first lens 21 toward the rear direction of the vehicle. The inwardly swaged first end, to which reference numeral 39 is attached, fixedly holds the first lens 21, the first spacer 11, the second lens 22, the second spacer 12, the third lens 23, the third spacer 13, the fourth lens 24, and the press member 14 with respect to the latch wall 31a (see FIG. 9B).

Note that, for thermally swaging the lens barrel 30, the lens barrel 30 is preferably made of a metallic material. The second end 30a2 of the lens barrel 30 can be thermally swaged inwardly to press the fourth lens 24 in the front direction of the vehicle. That is, the inwardly swaged second end can fixedly hold the first lens 21, the first spacer 11, the second lens 22, the second spacer 12, the third lens 23, the third spacer 13, the fourth lens 24, and the press member 14 with respect to the latch wall 31.

The lens barrel 30 can be configured such that the press member 14 threadably joined to the first end 30a1 of the lens barrel 30 to thereby press, from the front side of the vehicle, the first lens 21, the first spacer 11, the second lens 22, the second spacer 12, the third lens 23, the third spacer 13, the fourth lens 24, and the press member 14 with respect to the latch wall 31a (see FIG. 9B).

The lens barrel 30 can have an expansion outer diameter expanding from the first end 30a1 to the second end 30a2, in other words, a tapered outer diameter being tapered from the second end 30a2 to the first end 30a1.

In this modification, the radial thickness of each first wall section 36 of the tubular sidewall TS1 of the first barrel portion 32a1 can be equal to the radial thickness of the corresponding first wall section 36 of the tubular sidewall TS2 of the second barrel portion 32a2, and a radial depth of each concave recess 38 can be configured to expand from the front end of the vehicle to the rear end thereof. Alternatively, the radial thickness of each first wall section 36 of the tubular sidewall TS1 of the first barrel portion 32a1 and the radial thickness of the corresponding first wall section 36 of the tubular sidewall TS2 of the second barrel portion 32a2 can be configured to expand from the front end of the vehicle to the rear end thereof, and the radial depth of each concave recess 38 can be constant from the front end of the vehicle to the rear end thereof.

The functions of one element in the exemplary embodiment can be distributed as plural elements, and the functions that plural elements have can be combined into one element. At least part of the structure of the exemplary embodiment can be replaced with a known structure having the same function as the at least part of the structure of the exemplary embodiment. A part of the structure of the exemplary embodiment can be eliminated.

All aspects included in the technological ideas specified by the language employed by the claims constitute embodiments of the present disclosure.

While the illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those having ordinary skill in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A lens module comprising:
a lens barrel having a sidewall surrounding an optical axis thereof;
at least one lens disposed in the lens barrel;
at least one access hole formed through the sidewall for enabling external access into the lens barrel; and
a seal member configured to close the at least one access hole,
wherein the sidewall of the lens barrel comprises:
a first wall section that surrounds the at least one access hole; and
a second wall section that is other than the first wall section, the first wall section and the second wall section being arranged in a circumferential direction of the lens barrel,
the first wall section having a first inner circumferential surface and a first distance defined between the first inner circumferential surface and an outer circumferential surface of the at least one lens,
the second wall section having a second inner circumferential surface and a second distance defined between the second inner circumferential surface and the outer circumferential surface of the at least one lens,
the first distance being larger than the second distance, and
the first distance is configured to inhibit the seal member from adhering onto the at least one lens.

2. The lens module according to claim 1, wherein:
the at least one lens has a circular outer circumferential surface;
the first inner circumferential surface of the first wall section has a first radius of curvature;
the second inner circumferential surface of the second wall section has a second radius of curvature, the first radius of curvature being longer than the second radius of curvature.

3. The lens module according to claim 2, wherein:
the at least one lens comprises at least first and second lenses having respectively different outer diameters;
the at least one access hole comprises at least first and second access holes each formed through the sidewall for enabling external access into the lens barrel, each of the first and second access holes being arranged to face the corresponding one of the first and second lenses;
the first wall section comprises at least first and second sections configured to respectively surround the first and second access holes; and
the first and second sections of the first wall section have a substantially constant radial thickness.

4. The lens module according to claim 1, wherein:
the at least one lens comprises at least first and second lenses;
the at least one access hole comprises at least first and second access holes each formed through the sidewall for enabling external access into the lens barrel, each of the first and second access holes being arranged to face the corresponding one of the first and second lenses; and
the sidewall of the lens barrel comprises:
at least first and second concave recesses formed in an outer surface of the sidewall, each of the first and second concave recesses extending in a direction of an optical axis of the lens barrel,
each of the first and second concave recesses having a bottom, the first access hole being formed through the bottom of the first concave recess, the second access hole being formed through the bottom of the second concave recess.

5. The lens module according to claim 2, wherein:
the at least one lens comprises at least first and second lenses;
the at least one access hole comprises at least first and second access holes each formed through the sidewall for enabling external access into the lens barrel, each of the first and second access holes being arranged to face the corresponding one of the first and second lenses; and
the sidewall of the lens barrel comprises:
  at least first and second concave recesses formed in an outer surface of the sidewall, each of the first and second concave recesses extending in a direction of an optical axis of the lens barrel,
each of the first and second concave recesses having a bottom,
the first access hole being formed through the bottom of the first concave recess,
the second access hole being formed through the bottom of the second concave recess.

6. The lens module according to claim 3, wherein:
the at least one lens comprises at least first and second lenses;
the at least one access hole comprises at least first and second access holes each formed through the sidewall for enabling external access into the lens barrel, each of the first and second access holes being arranged to face the corresponding one of the first and second lenses; and
the sidewall of the lens barrel comprises:
  at least first and second concave recesses formed in an outer surface of the sidewall, each of the first and second concave recesses extending in a direction of an optical axis of the lens barrel,
each of the first and second concave recesses having a bottom,
the first access hole being formed through the bottom of the first concave recess,
the second access hole being formed through the bottom of the second concave recess.

7. The lens module according to claim 1, wherein:
the sealing member is colored to thereby prevent external light from entering an inside of the lens barrel.

8. A vehicular imaging device comprising:
a lens module according to claim 1; and
an image sensor comprising a light receiving area, the lens module being configured to focus light incident into the lens barrel on the light receiving area, the image sensor being configured to receive the light focused on the light receiving area as an image.

9. A lens module comprising:
a lens barrel having a sidewall surrounding an optical axis thereof;
at least one lens disposed in the lens barrel;
at least one access hole formed through the sidewall for enabling external access into the lens barrel; and
a seal member configured to close the at least one access hole,
wherein the sidewall of the lens barrel comprises:
  a first wall section that surrounds the at least one access hole; and
  a second wall section that is other than the first wall section, the first wall section and the second wall section being arranged in a circumferential direction of the lens barrel,
the first wall section having a first inner circumferential surface and a first distance defined between the first inner circumferential surface and an outer circumferential surface of the at least one lens,
the second wall section having a second inner circumferential surface and a second distance defined between the second inner circumferential surface and the outer circumferential surface of the at least one lens,
the first distance being larger than the second distance,
a region within the lens barrel is defined by the first inner circumferential surface, the outer circumferential surface of the at least one lens and the first distance, and
the region is not filled with the seal member.

10. The lens module according to claim 9, wherein:
the at least one lens has a circular outer circumferential surface;
the first inner circumferential surface of the first wall section has a first radius of curvature;
the second inner circumferential surface of the second wall section has a second radius of curvature, the first radius of curvature being longer than the second radius of curvature.

11. The lens module according to claim 10, wherein:
the at least one lens comprises at least first and second lenses having respectively different outer diameters;
the at least one access hole comprises at least first and second access holes each formed through the sidewall for enabling external access into the lens barrel, each of the first and second access holes being arranged to face the corresponding one of the first and second lenses;
the first wall section comprises at least first and second sections configured to respectively surround the first and second access holes; and
the first and second sections of the first wall section have a substantially constant radial thickness.

12. The lens module according to claim 9, wherein:
the at least one lens comprises at least first and second lenses;
the at least one access hole comprises at least first and second access holes each formed through the sidewall for enabling external access into the lens barrel, each of the first and second access holes being arranged to face the corresponding one of the first and second lenses; and
the sidewall of the lens barrel comprises:
  at least first and second concave recesses formed in an outer surface of the sidewall, each of the first and second concave recesses extending in a direction of an optical axis of the lens barrel,
each of the first and second concave recesses having a bottom,
the first access hole being formed through the bottom of the first concave recess,
the second access hole being formed through the bottom of the second concave recess.

13. The lens module according to claim 10, wherein:
the at least one lens comprises at least first and second lenses;
the at least one access hole comprises at least first and second access holes each formed through the sidewall for enabling external access into the lens barrel, each of the first and second access holes being arranged to face the corresponding one of the first and second lenses; and the sidewall of the lens barrel comprises:
at least first and second concave recesses formed in an outer surface of the sidewall, each of the first and second concave recesses extending in a direction of an optical axis of the lens barrel,
each of the first and second concave recesses having a bottom,
the first access hole being formed through the bottom of the first concave recess,
the second access hole being formed through the bottom of the second concave recess.

14. The lens module according to claim 11, wherein:
the at least one lens comprises at least first and second lenses;
the at least one access hole comprises at least first and second access holes each formed through the sidewall for enabling external access into the lens barrel, each of the first and second access holes being arranged to face the corresponding one of the first and second lenses; and the sidewall of the lens barrel comprises:
at least first and second concave recesses formed in an outer surface of the sidewall, each of the first and second concave recesses extending in a direction of an optical axis of the lens barrel,
each of the first and second concave recesses having a bottom,
the first access hole being formed through the bottom of the first concave recess,
the second access hole being formed through the bottom of the second concave recess.

15. The lens module according to claim 9, wherein:
the sealing member is colored to thereby prevent external light from entering an inside of the lens barrel.

16. A vehicular imaging device comprising:
a lens module according to claim 9; and
an image sensor comprising a light receiving area, the lens module being configured to focus light incident into the lens barrel on the light receiving area, the image sensor being configured to receive the light focused on the light receiving area as an image.

17. The lens module according to claim 1, wherein:
the first wall section has a first circumferential length in the circumferential direction, the second wall section has a second circumferential length in the circumferential direction, and the first circumferential length is set to be larger than the second circumferential length.

* * * * *